United States Patent [19]

Bianchi

[11] 4,294,063
[45] Oct. 13, 1981

[54] HARVESTER AND METHOD FOR HARVESTING GREEN TOMATOES

[76] Inventor: George Bianchi, P.O. Box 190, Merced, Calif. 95341

[21] Appl. No.: 119,308

[22] Filed: Feb. 7, 1980

[51] Int. Cl.³ .......................................... A01D 17/08
[52] U.S. Cl. ..................................... 56/16.4; 134/68; 171/27
[58] Field of Search ..................... 56/16.4, 16.5, 16.6; 171/27; 134/133, 134, 68, 73

[56] References Cited

U.S. PATENT DOCUMENTS

| | | | |
|---|---|---|---|
| 1,931,463 | 10/1933 | Brogden | 134/68 |
| 3,269,099 | 8/1966 | Fricks | 56/1 |
| 3,447,544 | 6/1969 | Vergara | 134/68 |
| 3,633,677 | 1/1972 | Walker | 171/27 |
| 3,683,945 | 8/1972 | Weisser | 134/68 |
| 3,698,171 | 10/1972 | Hecht | 56/16.5 |

*Primary Examiner*—Robert A. Hafer
*Attorney, Agent, or Firm*—Huebner & Worrel

[57] ABSTRACT

A harvester for green tomatoes growing on vines in a row having a frame mounted for travel along such a row, a knife borne by the frame to sever such vines in the row, a conveyor for elevating the severed vines in the frame, an aqueous bath, a vibrating conveyor above the tank adapted to receive vines with tomatoes adherent thereto from the elevating conveyor and to shake tomatoes from the vines for descent into the tank, a straining conveyor in the bath adapted to strain tomatoes from the bath and to elevate them therefrom, and a source of air under pressure directed at tomatoes removed from the bath to dry surface moisture therefrom as well as a method for harvesting such tomatoes including severing the vines from the ground, shaking the vines to dislodge tomatoes therefrom for gravitational descent therefrom, catching the tomatoes in an aqueous bath, circulating water in the bath to wash the tomatoes, removing the washed tomatoes from the bath, and subjecting the tomatoes to an air blast to dry surface moisture therefrom all while traveling along the row.

10 Claims, 6 Drawing Figures

Fig. 1

HARVESTER AND METHOD FOR HARVESTING GREEN TOMATOES

BACKGROUND OF THE INVENTION

1. Field of the Invention:

The present invention relates to a harvester and method of harvesting green tomatoes, and more particularly to such a harvester and method for use in a field of tomato-bearing vines automatically and continuously to sever the vines and reject the vines after detaching the tomatoes and to wash the detached tomatoes in a recirculating aqueous bath, reject undersized tomatoes, and discharge the processed tomatoes with their surfaces in a dry condition.

2. Description of the Prior Art:

In the commerical growing of tomatoes in large quantities, they are harvested by severing the vines from the earth with the tomatoes attached and then mechanically separating the tomatoes from the vines. Quantities of clods, loose earth, and other contaminants are picked up during the harvesting and must be removed from the tomatoes. Such harvesting and processing of tomatoes by manual methods in prohibitively expensive in large scale commerical production, and machinery has been adapted to use for this purpose when tomatoes are harvested in the ripe condition for use in canning products, such as catsup.

However, it has not heretofore been possible satisfactorily to mechanize the harvesting of "green" tomatoes which are ripened in transit after harvest and then eaten fresh. Methods and harvesters for the mechanization of ripe tomato harvesting are not satisfactory for green tomato harvesting because the green tomatoes are both easily damaged and more difficult to detach from the vines than ripe tomatoes and yet must reach the consumer in an undamaged condition.

It is highly desirable that a harvester and harvesting method for use with green tomatoes not only deliver the tomatoes in an undamaged condition, but also remove substantially all debris and contaminants from the tomatoes in the field to substantially accelerate the harvest, avoid damage to the tomatoes in transit by contact with undesirable substances, and avoid the expense of transporting useless material with the tomatoes.

It is difficult to provide such a method which is fully effective since the method must not only deliver the harvested tomatoes in a clean and undamaged condition, but must also be adapted for use in a harvester which is sufficiently mobile, compact, and rugged for operation in the field while harvesting with sufficient speed that the harvest of large, economically efficient, plots can be completed while the tomatoes are in peak condition.

Another difficulty in providing a suitable harvester and harvesting method for use in the field to harvest green tomatoes is that, while the tomatoes must be washed to fully cleanse them, it is impractical to provide a large quantity of water in the field. Even if a sufficient quantity could be provided, a mobile harvester cannot practically transport a quantity sufficient for complete washing of tomatoes if the wash water is discharged either with the tomatoes or the material washed therefrom.

It is also essential that green tomatoes, which have been processed by washing for ripening in transit, are nevertheless substantially dry and sterile so to substantially prevent decay during shipping and subsequent marketing.

SUMMARY OF THE INVENTION

An object of the present invention is to minimize the cost of harvesting green tomatoes for fresh consumption.

Another object is to improve the quality of fresh tomatoes by minimizing damages thereto incident to conventional harvesting procedures and apparatus.

Another object is to mechanize the harvesting of green tomatoes.

Another object is to accelerate the harvesting of fresh tomatoes to permit better timing of the harvest in relation to crop maturity.

Another object is to provide a method and harvester for green tomatoes which cleanse the tomatoes in the field in an aqueous bath and yet do not have to be supplied with water continuously.

Another object is to process harvested green tomatoes in the field in a manner which leaves them substantially dry and free from vine fragments, earth, and other contaminants and debris.

Further objects are to provide improved elements and arrangements thereof in a harvester for green tomatoes which is durable, efficient, and fully dependable in achieving its intended purposes.

Still further objects and advantages will become apparent in the subsequent description in the Specification.

PRIOR ART STATEMENT

Characterizing the closest prior art of which the applicant is aware and in compliance with 37 C.F.R. § 1.97 and § 1.98, attention is invited to U.S. Pat. No. 3,269,099 issued to Fricks on Aug. 30, 1966. This patent is thought to be relevant in its disclosure of an apparatus and method for harvesting berries in which the berries fall into a trough containing water as they are picked and are then conveyed to a tank containing water.

DESCRIPTION OF THE PREFERRED EMBODIMENT

Figure 1:
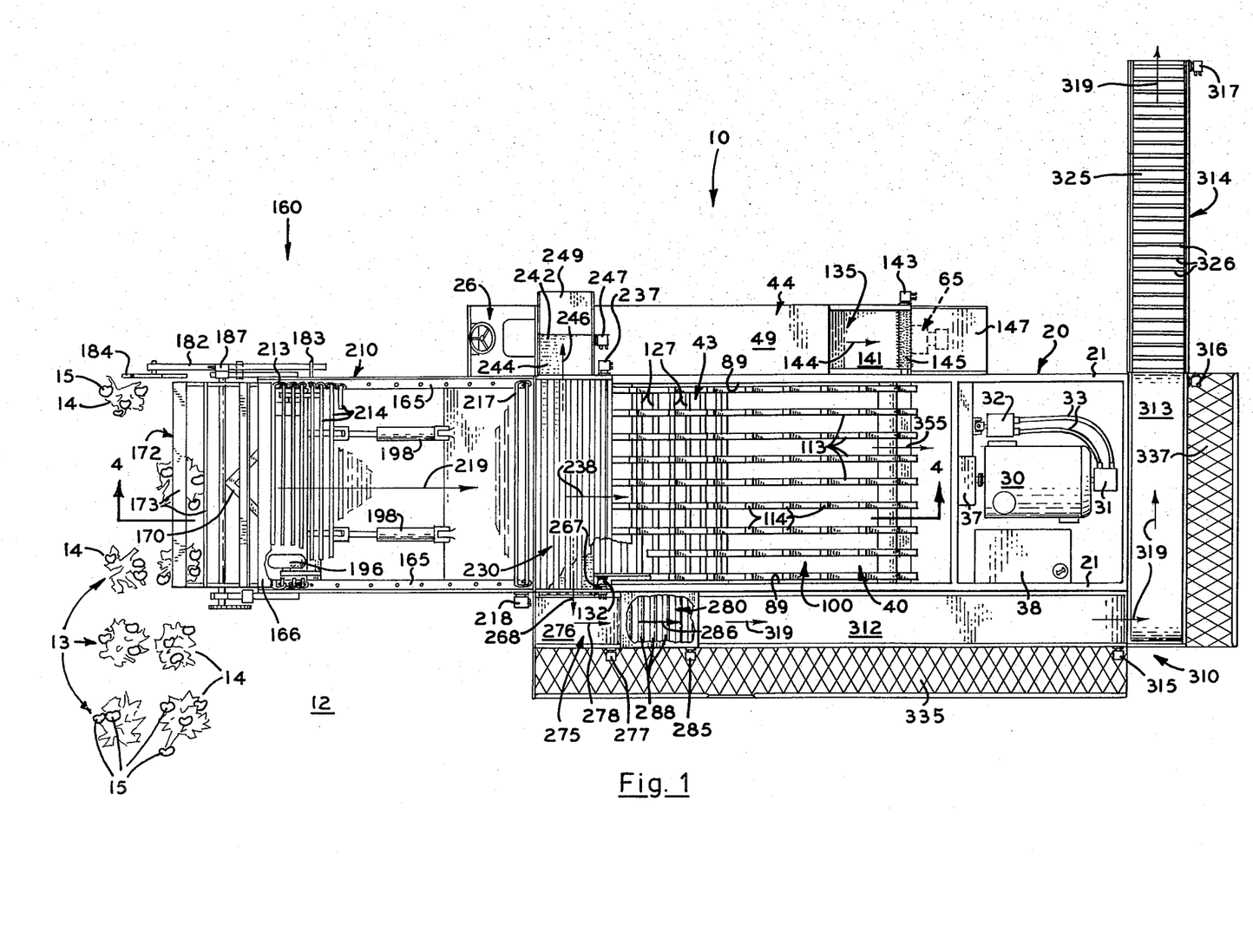
FIG. 1 is a plan view of a harvester for green tomatoes which embodies the principles of the present invention with portions of the harvester broken away for illustrative convenience.
Figures 2, 3, 5:
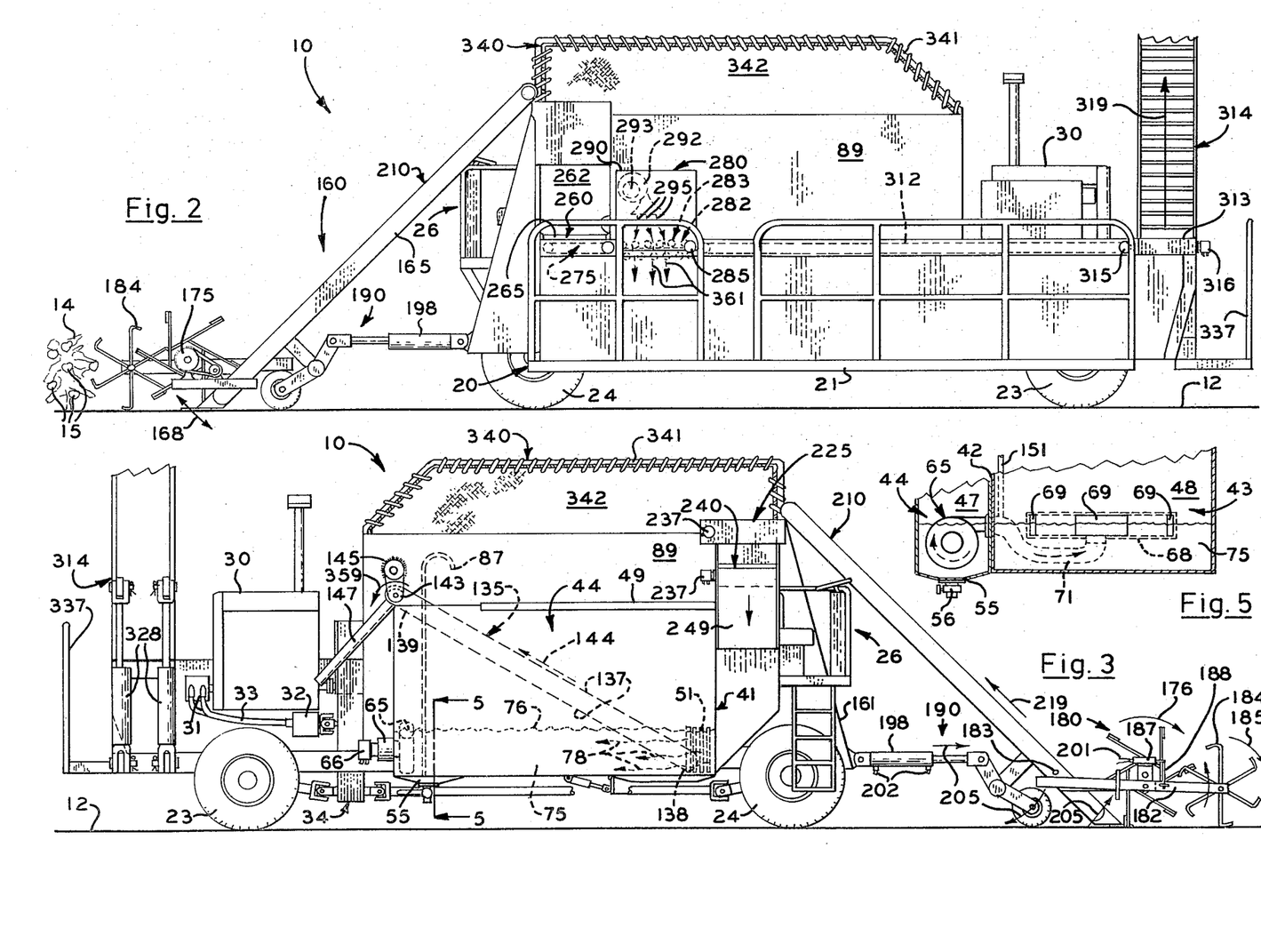
FIG. 2 is a side elevation of the harvester of FIG. 1.
FIG. 3 is a side elevation of the harvester showing the side thereof opposite to that shown in FIG. 2.
FIG. 5 is a fragmentary section of a tank employed with the harvester taken on line 5—5 of FIG. 3.

Referring more particularly to the drawings, in FIGS. 1 through 4 is shown a harvester 10 for green tomatoes which embodies the principles of the present invention and performs the method thereof. The harvester is shown on an earth surface 12 in a field in which grows a plurality of rows 13 of tomato vines 14 bearing tomatoes 15, as shown in FIGS. 1 and 2.

The harvester has a rectangular frame 20 elongated in a direction along the rows 13. The frame has a pair of longitudinally extending, transversely spaced side rails 21. The frame is supported on the surface 12 for movement parallel to the rows by a pair of steerable rear wheels 23 and a pair of front wheels 24. The rear wheels are steered and the harvester is otherwise controlled in a well-known manner from a set of operator's controls 26. These controls are mounted on the frame in a group disposed above the front wheels, and as shown in FIG. 1, disposed transversely outwardly of the one of the rails which is depicted as toward the bottom in FIG. 1.

The harvester 10 has an engine 30 mounted rearwardly on the frame 20. The engine drives a hydraulic pump 31 disposed rearwardly therefrom. The pump energizes a relatively large hydraulic motor 32 through interconnecting hoses 33. This motor, in turn, drives the wheels 23 and 24 by a transmission system 34. The engine also drives a hydraulic system 37 which supplies hydraulic fluid from a reservoir 38 under pressure to various motors and rams subsequently to be described. The engine and hydraulic elements mentioned in this paragraph are of well-known construction and are, therefore, schematically represented. It is to be understood that these motors and rams are conventionally connected to the hydraulic power system by conduits and control valves which are not shown since suitable arrangements therefor will be obvious to one skilled in the art.

The harvester has an aqueous bath indicated generally by the numeral 40 and best shown in FIGS. 1, 3, 4, and 5. The bath includes a tank 41 mounted on the frame 20 between the wheels 23 and 24. The tank has a dividing wall 42 which extends longitudinally of the frame and divides the tank into a tomato washing compartment 43 and a water cleaning compartment 44. These compartments are rectangular and have a common forward wall 46 spaced rearwardly of the controls 26. The cleaning compartment has a rearward wall 47 spaced forwardly of the engine 30. The washing compartment has a rearward wall 48 rearwardly spaced from the rearward wall of the cleaning compartment. The washing compartment is substantially as wide as the frame and the dividing wall is disposed above the one of the rails corresponding transversely to the controls. The cleaning compartment is thus disposed outwardly of the frame and extends rearwardly of the controls 26. The cleaning compartment has a cover 49 extending from a point substantially forward of its rearward wall to the forward wall. The dividing wall is provided with a plurality of constrictions or vertical slots 51 adjacent to its forward end which interconnect the compartments. The slots are substantially narrower than a tomato of commerically acceptable size and are substantially wider than debris of small particle size which contaminates the tomatoes.

The cleaning compartment 44 has a sump 55 at its rearward end, as shown in FIGS. 3 and 5. The sump includes a drain valve 56 of any suitable form. The washing compartment 43 has a rectangular box-like sump 57 mounted beneath its forward end. The rearward end of the sump is selectively opened or closed by a pivotally mounted flap 58 actuated by a hydraulic ram 59.

Figures 4A, 4B:
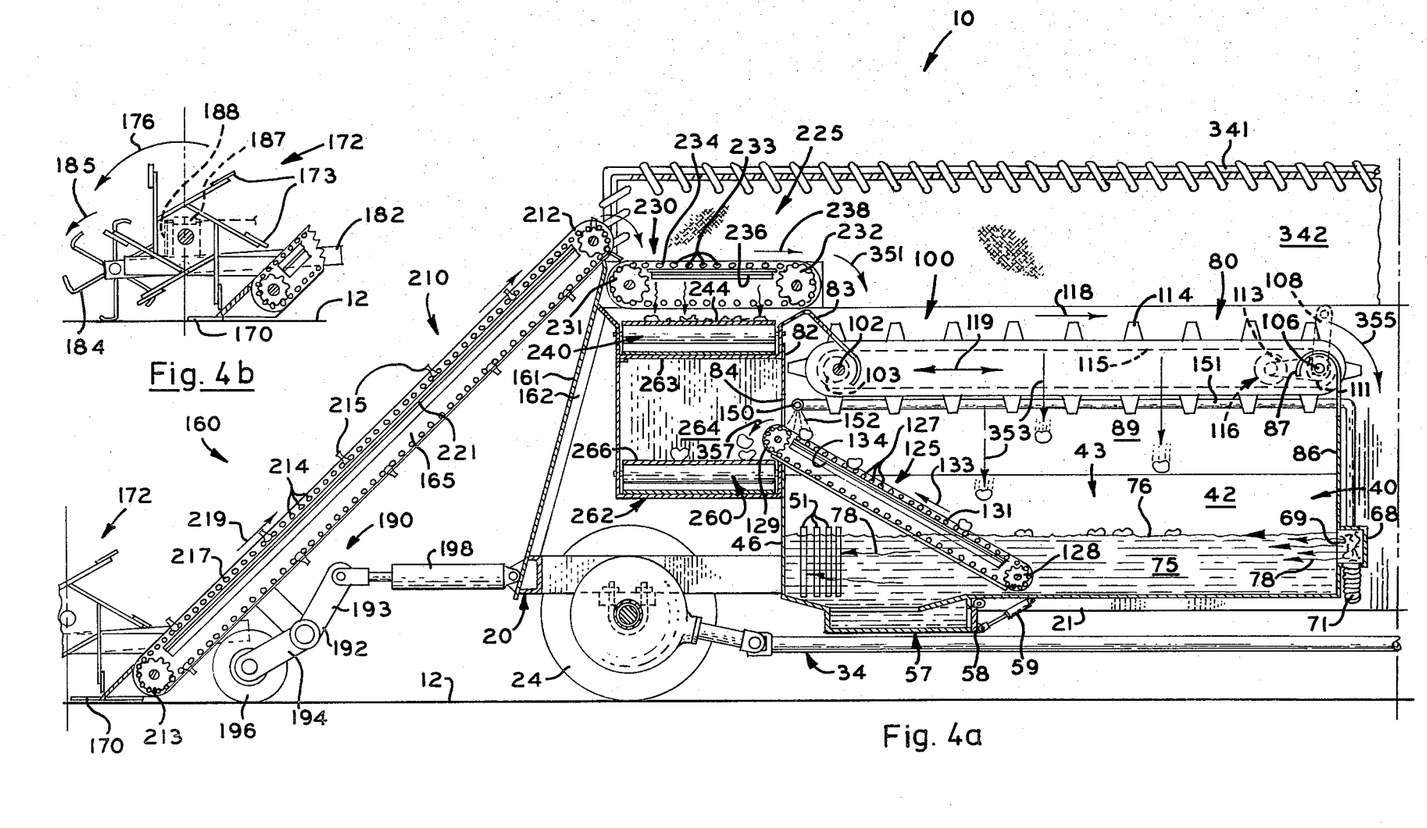
FIGS. 4a and 4b are portions of a composite longitudinal vertical section of the harvester taken on line 4—4 of FIG. 1.

The tank 41 is provided with a circulating pump assembly 65, best shown in FIGS. 3, 4, and 5, mounted downwardly of the rearward wall 47 of the cleaning compartment 44. This assembly has a pump disposed within the compartment driven by a hydraulic motor 66 disposed outwardly thereof. The pump has an inlet within the compartment and an outlet which extends through the dividing wall 42 toward the washing compartment 43. The washing compartment has a rectangular water box 68 extending across and rearwardly of the wall 48. The box communicates with the washing compartment through three rectangular openings 69. One of these openings is transversely centered in the compartment and the other two are substantially narrower and are disposed individually at the ends of the box. The box and the outlet of the pump are interconnected for water flow by a hose 71.

The bath 40 contains a pool 75 of chlorinated water disposed in the tank 41 at a level indicated by the arrow 76. The water in the pool is circulated by the pump assembly 65 in a continuous stream in a closed circuit indicated by the arrows 78. The water is drawn by the pump from the rearward end of the cleaning compartment 44, and discharged through the hose 71, the box 68, and the openings 69 into the washing compartment 43. The water flows through this compartment in a direction forwardly along the frame 20, through the slots 51, and then in a direction rearwardly along the frame through the cleaning compartment to return to the pump assembly.

The harvester 10 has a rectangular separating compartment 80 disposed generally upwardly of the tomato washing compartment 43 and best shown in FIGS. 1 and 4. The separating compartment is upwardly and downwardly open. This compartment has a forward wall 82 extending upwardly from the wall 46. The separating compartment wall terminates upwardly in a return bend 83 disposed within the compartment. The lower portion of this wall is provided with a rectangular opening 84 extending horizontally across it adjacent to the tank 41. The separating compartment has a rearward wall 86 extending upwardly from the wall 48 to a return bend 87. This bend is disposed within the separating compartment at substantially the same elevation as the bend 83. This compartment has a pair of side walls 89. One of these walls extends upwardly and rearwardly from the dividing wall 42 and the other is substantially identical to the one wall and extends similarly from the wall of the washing compartment which is opposite the dividing wall 42.

The harvester 10 has a vibrating or shaking conveyor 100 of known construction mounted within the separating compartment 80. This conveyor extends horizontally over the washing compartment 43. The conveyor has a forward shaft 102 rotationally mounted on the side walls 89 and disposed within the return bend 83. This shaft is provided with a plurality of eccentrically mounted sprockets 103 spaced along it between the side walls. The conveyor has a rearward shaft 106 extending parallel to the forward shaft within the return bend 87. Each end of this shaft is mounted for swinging movement on the corresponding side wall by a suspension link 108 adjacent to the wall. The rearward shaft is rotationally received in each link and is provided with a plurality of concentric sprockets 111 individually aligned with the sprockets on the forward shaft. Each aligned pair of sprockets is engaged by an endless chain 113 which is wrapped about the sprockets and is supported thereon. The chain has a plurality of teeth 114 spaced along it and extended outwardly from it. The return bends are slotted so that the chains and the teeth extend through the bends. The conveyor has an upper run 115 and is driven by a hydraulic drive assembly 116 which rotationally drives the rearward shaft in a direction such that, as indicated by the arrows 118, the upper run moves in a conveying direction rearwardly of the frame 20 while the lower run moves in a forward direction. Due to the action of the eccentric sprockets and the swinging movement of the links, the conveyor is simultaneously shaken in an oscillating movement longitudinally of the frame, as indicated by the arrows 119.

The harvester 10 has a straining conveyor 125, best shown in FIGS. 1 and 4, of well-known construction mounted on the tank 41 within the washing compartment 43. This conveyor has an endless chain including a plurality of transversely extending, parallel rods or bars 127 spaced along it. The bars are spaced apart a distance somewhat greater than the width of the slots 51 and are substantially equal in length to the width of the tomato washing compartment 43. The conveyor has a lower end 128 adjacent to the bottom of this compartment and rearwardly adjacent to its sump 57. This conveyor is inclined upwardly and forwardly from its lower end to an upper end 129 which is disposed downwardly in the opening 84. The conveyor has an upper run 131 and is driven by a motor 132 so that his run moves upwardly toward the opening, as indicated by the arrow 133. The upper run is thus disposed in the closed circulation circuit at a point immediately before the water enters the slots 51. The upper run is slidably supported by a plurality of bars 134 extending parallel to its direction of movement.

The harvester 10 has a sieving conveyor 135 mounted on the tank 41 within the water cleaning compartment 44 and best shown in FIGS. 1 and 3. The conveyor has an endless belt 137 having a width substantially equal to that of the compartment. The belt is of mesh construction having openings substantially smaller than the width of the slots 51 and, therefore, substantially narrower than the space between the bars 127 of the straining conveyor. The sieving conveyor has a lower end 138 adjacent to the bottom of the cleaning compartment and rearwardly adjacent to the slots. The conveyor is inclined upwardly and rearwardly from this end to an upper end 139 disposed rearwardly of the cover 49 and in upwardly and rearwardly adjacent relation to the wall 47. The conveyor thus has an upper run 141 which is disposed in the closed circulation at a point immediately downstream of the slots. The conveyor has a hydraulic drive assembly 143 mounted adjacent to its upper ends which drives the upper run in a direction, indicated by the arrow 144, from the lower end of the conveyor to its upper end.

The sieving conveyor 135 is provided with a cylindrical bristle brush 145 extending across and in engagement with its upper end 139. The brush is rotationally mounted on the tank 41 and is rotationally driven by the drive assembly 143. This conveyor is provided with a chute 147 mounted on the tank 41 and inclined downwardly and rearwardly from a point below the upper end of the conveyor toward the earth surface 12.

A spray pipe 150 is mounted on the walls 89 and is extended therebetween transversely across the upper end 129 of the straining conveyor 125. This pipe is supplied with water under pressure from the pump assembly 65 by a pipe 151. The spray pipe is downwardly perforated so that a spray of water issues from it, as indicated by the numeral 153, onto the upper run 131 of the conveyor 125 adjacent to its upper end.

The harvester 10 has a vine supply unit 160 mounted forwardly on the frame 20 and shown in FIG. 1 through 4. This unit has an apron 161 extending upwardly and rearwardly from the forward end of the frame to a point substantially above and forwardly of the return bend 83 of the forward wall 82 of the compartment 80. The width of the apron is substantially equal to the width of the frame and the sides of the apron are formed by a pair of beams 162 extending individually upwardly from the rails 21. The supply unit has a pair of rails 165 extending downwardly and forwardly from the upper ends of these beams. The upper ends of these rails are fixedly connected by a transversely extending, horizontal member 166 which is adjacent to the earth surface 12. The lower end of rails can thus move pivotally in relation to their upper ends and to the earth surface, as indicated by the arrow 168 in FIG. 2.

The vine supply unit 160 of the harvester 10 has a V-shaped, forwardly sharpened knife 170 mounted on the member 166 in closely adjacent relation to the earth surface 12. The knife is disposed with its center forwardly and centrally disposed between the rails 165 and its sides extending divergently rearwardly toward the rails. The unit has a paddle wheel 172 mounted on the rails 165 for rotation about a transverse horizontal axis. The wheel extends between the rails and has a plurality of flexible paddles 173 extended axially across its periphery and radially therefrom into engagement with the earth surface. The wheel is rotated by a hydraulic drive assembly 175 in a direction, indicated by the arrow 176, which corresponds to forward movement of the frame at a peripheral velocity substantially greater than the velocity of this movement.

The unit 160 has an elevation sensing system indicated generally by the numeral 180. This system is mounted on the rails 165 adjacent to the paddle wheel 172 at the axial end thereof disposed toward the controls 26. This system has a generally horizontal beam 182 pivotally mounted on the rails for movement about an axis parallel to and immediately below the axis of the paddle wheels. The beam has a portion extending rearwardly from its pivot for engagement of a stop 183 on the adjacent rail 165 which limits upward movement of this portion. The beam has a portion extending forwardly of its pivot to an end having a gauge wheel 184 rotationally mounted thereon. This wheel is a finger wheel of conventional construction and is rotated in the direction indicated by the arrow 185 solely by engagement with the earth surface. The diameter of the gauge wheel is such that the beam is substantially horizontal when the knife 170 is parallel and closely adjacent to the earth surface 12. The sensing system has an electric switch 187 fixedly mounted in relation to the beams 165 above the pivot of the beam 182. The switch is actuated by a bar 188 extended upwardly from the beam 182 when the beam departs significantly from a horizontal position due to engagement of the gauge wheel with irregularities in the earth surface.

The unit 160 includes a pair of elevation control assemblies indicated generally by the numeral 190. These assemblies interconnect the beams 165 with the forward end of the frame 20. Each assembly has a bell crank 192 pivotally mounted on the corresponding beam at a point somewhat rearwardly of the member 166 for movement about a horizontal, transverse axis. The bell crank has a first arm 193 extending forwardly and downwardly from the axis and a second arm 194 extending upwardly and rearwardly of the axis. The first arm has a support wheel 196 mounted at the extremity thereof in rolling engagement with the earth surface 12. A hydraulic ram 198 interconnects the extremity of the second arm with the forward end of the frame.

The harvester 10 is provided with a well-known electrohydraulic elevation control system which senses the position of the switch 187 through electrical wires 201 connected thereto and provides appropriate hydraulic pressure to hoses 202 connected to the rams 198 to maintain the knife 170 adjacent to the earth surface 12. The control system is constructed so that, as indicated in FIG. 3 by the arrows 205, when the gauge wheel 184 encounters an upward irregularity, the forward portion of the beam 182 pivots upwardly causing the bar 188 to actuate the switch in rearward direction. The control system causes the ram 198 to extend and pivot the support wheel downwardly in relation to the beams 165, thereby raising the beams and the knife to a position corresponding to the elevation of the irregularity.

The vine supply unit 160 has a vine elevating conveyor 210 of well-known construction and best shown in FIGS. 1 and 4. This conveyor extends transversely between the rails 155 and is substantially equal in length thereto, having an upper end 212 disposed in upwardly adjacent relation to the top of the apron 161 and lower end 213 disposed immediately upwardly of the knife 170 beneath the periphery of the paddle wheel 172. The conveyor has an endless chain formed of linked transverse bars 214 from which spikes 215 outwardly extend. The conveyor has an upper run 217 and is driven by a hydraulic motor 218 in a direction indicated by the arrows 219 such that the upper run moves from the lower end of the conveyor toward its upper end. The upper run is slidably supported by a plurality of rails 221 extending beneath it in a direction parallel to its direction of movement.

The harvester 10 has a clod removal unit 225 mounted on and between the apron 161 and the separating compartment 80 immediately upwardly of the vibrating conveyor 100. This conveyor is aligned transversely of the frame 20 with the vibrating conveyor and the elevating conveyor 210. The removal unit has a feed conveyor 230 disposed at an elevation between that of the upper end 217 of the elevating conveyor and the upper run 115 of the vibrating conveyor. The feed conveyor is substantailly equal in width to these conveyors. The feed conveyor has a forward end 231 disposed in downwardly spaced, adjacent relation to the upper end of the elevating conveyor and a rearward end 232 disposed above the bend 83. This conveyor has an endless chain formed of linked, transversely extended, parallel bars 233. The bars are spaced along the distance somewhat less than the diameter of the smallest tomato 15 which is of acceptable size for harvesting. The conveyor has an upper run 234 slidably supported in a plurality of bars 236. The conveyor is driven by a hydraulic motor 237 so that its upper run moves in a direction indicated by the arrow 238 from the elevating conveyor toward the vibrating conveyor.

The clod removal unit 225 includes a discharge belt conveyor 240, shown in FIGS. 1, 3, and 4, extending horizontally beneath the feed conveyor 230. This conveyor has a discharge end 242 disposed behind the controls 26 and extends transversely of the frame 20 to an opposite end disposed above the one of the frame rails 21 opposite of the controls. The conveyor has an upper run 244 spaced somewhat below the feed conveyor and is driven in a direction toward the discharge end, as indicated by the arrow 246, by a hydraulic motor 247. A chute 249 extends downwardly and transversely of the frame from a point beneath the discharge end of the conveyor to a point outwardly of the cleaning compartment 44.

The harvester 10 has a transverse tomato transporting belt conveyor 260, shown in FIGS. 1, 2, and 4. This conveyor is horizontal and is disposed within and mounted on the walls of a rectangular compartment 262. This compartment is disposed beneath the discharge conveyor 240 and forwardly of the opening 84. The rear wall of the compartment is formed by the wall 82. The compartment has a horizontal roof 263 which separates it from the discharge conveyor and an end wall 264 which is an extension of the one of the separating compartment side walls 89 which is adjacent to the controls 26. The end of the compartment opposite this end wall is open. The conveyor extends beneath the upper end 129 of the straining conveyor 125 from this end wall to a discharge end 265 outwardly of the opposite side wall of the separating compartment. The conveyor has an upper run 266 disposed immediately below the upper end of the straining conveyor. The transporting conveyor has a hydraulic motor 267 which drives it so that its upper run moves away from the end wall 264 as indicated by the arrow 268.

The harvester 10 has a longitudinal transporting belt conveyor 275 shown in FIGS. 1 and 2. This conveyor extends horizontally and longitudinally of the frame 20 adjacent to the side of the washing compartment 43 which is opposite the controls 26. This conveyor is mounted on the frame and has an upper run 276 disposed beneath the discharge end 265 of the conveyor 260. The longitudinal conveyor extends somewhat rearwardly of the frame from this discharge end. The longitudinal conveyor has a hydraulic motor 277 which drives it so that the upper run moves in a rearward direction, as indicated by the arrow 278.

The harvester 10 has a sizing and drying unit 280, shown in FIGS. 1 and 2, mounted on the frame 20 rearwardly of the longitudinal transporting conveyor 275. This unit has a sizing conveyor 282. This conveyor is horizontal and has an upper run 283 extended rearwardly of the frame from the upper run 276 of the belt conveyor 275. The sizing conveyor is driven by a hydraulic motor 285 which motivates its upper run rearwardly, as indicated by the arrow 286. The sizing conveyor is constructed of a plurality of linked transversely extended, parallel bars 288 which are spaced a distance substantially equal to the diameter of the smallest size of tomato 15 which is commercially acceptable.

The unit 10 has a box-like cover 290 which is coextensive with the sizing conveyor 282 and is forwardly and rearwardly open. The unit has a blower 292 which is driven by a hydraulic motor 293 and is mounted within the cover. The blower extends transversely across the sizing conveyor and discharges a blast of air toward its upper run 283 as indicated by the arrows 295.

The harvester 10 has a processed tomato discharge system indicated generally by the numeral 310 and shown in FIGS. 1, 2, and 3. This system has a longitudinal belt conveyor 312, a transverse belt conveyor 313, and an elevator 314. These elements are of well-known construction and are driven by respective hydraulic motors 315, 316, and 317 so as to convey tomatoes received thereon successively in the directions indicated by the arrows 319. The longitudinal conveyor extends horizontally and rearwardly of the frame 20 from the sizing conveyor 282 to a point rearwardly of the engine 30. The transverse conveyor extends across the frame rearwardly of the engine from the longitudinal conveyor, and the elevator extends outwardly of the frame from this conveyor. The elevator 314 has an endless belt 325 provided with transverse bars 326. The end of the elevator adjacent to the transverse conveyor 313 is pivotally connected to the frame so that the inclination of the elevator can be selectively varied by a pair of hydraulic rams 328 which interconnects the elevator with the adjacent frame rail 21. The elevator conveyor can thus be adjusted to extend over a nurse truck, not shown, which moves over the earth surface 12 alongside the harvester.

The harvester 10 is provided with a longitudinal catwalk 335 and with a transverse catwalk 337 which are mounted on the frame 20 at the level of the rails 21. The longitudinal catwalk extends in parallel, outwardly adjacent relation to the conveyors 275, 282, and 312. The transverse catwalk extends in corresponding relation to the conveyor 313.

Each side wall 89 of the separating compartment 80 is surmounted by a planar barrier 340 which is an extension of the walls and is substantially equal in length. Each barrier includes a railing 341 extended upwardly from its respective side wall and a canvas sheet 342 laced to the railing and closing the space between the railing and the wall.

OPERATION

The operation of the described embodiment and method of the present invention are believed to be clearly apparent and are briefly summarized at this point.

The harvester 10 is utilized when the tomatoes 15 are in a green condition, but are at a stage of maturity such that they will ripen in transit. At this stage, the tomatoes are adherent to the vines 14 and are somewhat buoyant in water. The harvester is guided along the rows 13 by utilizing the controls 26 to steer the rearward wheels 23 with the four wheels 23 and 24 being driven by the engine 30.

As the harvester 10 moves along the rows 13, the knife 170 is maintained in a position adjacent to or just below the earth surface 12 by the action of the elevation sensing system 180 and the elevation control system 190. The knife, therefore, severs the vines 14 at the earth surface with the tomatoes 15 adhering thereto. The paddles 173 aid the severing by urging the vines against the knife. The paddles then urge the severed vines onto the elevating conveyor 210. Since the knife 170 moves adjacent to the earth surface, clods and other debris from the earth surface and the vines become intermingled with the vines. The vines are engaged by the spikes 215 and are elevated together with the adherent tomatoes and debris in the direction indicated by the arrows 219 and discharged therewith into the clod removal unit 225.

The vines 14, adherent tomatoes 15, clods, and other debris are discharged from the conveyor 210 onto the upper feed conveyor 230 and carried along in the direction of the arrow 238. Clods and particles of debris which are smaller than the spaces between the bars 223 fall downwardly from the feed conveyor along with any unattached tomatoes which are too small for harvest onto the upper run 244 of the discharge conveyor 240. This material is then transported in the direction of the arrow 246, discharged onto the chute 249, and gravitationally discharged therefrom onto the earth surface 12. The vines and adherent tomatoes and other material remaining on the feed conveyor are then discharged therefrom into the separating compartment 80 in a continuous stream, as indicated by the arrow 351.

The material discharged from the feed conveyor 230 is received on the upper run 115 of vibrating conveyor 100 and simultaneously conveyed along it as indicated by the arrows 118 and shaken as indicated by the arrows 119. The shaking action dislodges the tomatoes 15 from the vines 14. The dislodged tomatoes and particulate debris not removed by the unit 225 descend gravitationally from the conveyor in a continuous stream indicated by the arrows 353 into the pool 75 within the tomato washing compartment 43. However, the vines which are engaged by the teeth 114 and rested on the chains 113 continue along the conveyor and are discarded therefrom between the washing compartment 43 and the engine 30 onto the earth surface 12, as indicated by the arrow 355.

As the stream of tomatoes 15 drops from the conveyor 100 into the washing compartment 43, they are caught in water of the bath 40. As each slightly buoyant tomato falls into the water, the velocity attained from the height of its fall causes it to be immersed so that the entire surface of the tomato is rinsed on impact with the water. The tomatoes received in the water in the washing compartment are circulated with the chlorinated water therein in the direction indicated by the arrows 78. This circulation of the tomatoes tumbles them together, further washing them while they are exteriorly sterilized by the chlorinated water. While the buoyant tomatoes move with the water toward the straining conveyor 125, non-buoyant tomatoes or portions thereof, debris, and silt from earth washed from the tomatoes descend toward the bottom of the compartment and are carried into its sump 55. The buoyant tomatoes in the washing compartment are carried into engagement with the upper run 131 of the straining conveyor and are lifted in a continuous stream between its bars 127 in the direction of the arrow 132 and thereby removed from the bath. As the tomatoes are so elevated from the tank 41, they are subjected to a washing by the spray 152 to remove any remaining earth and debris before they are discharged, as indicated by the arrow 357, through the opening 84 onto the conveyor 260.

While the tomatoes 15 are removed from the washing compartment 43, earth non-buoyant tomatoes, and debris washed therefrom remain in the compartment and particles of such material of a size too large to pass through the slots 51 with the water are retained in this compartment. These particles settle into the sump 57 and are removed from time to time by opening the flap 58. Debris of small particle size circulates between the bars 127 of the straining conveyor 125 with the water while the tomatoes 15, which are substantially larger, are elevated thereon. The debris of small particle size is then admitted through the slots 51 into the cleaning compartment 44 while tomatoes and debris of a predetermined larger size are retained in the washing compartment. The debris which enters the cleaning compartment circulates toward and through the sieving conveyor 135 which filters the debris from the water. This debris is carried upwardly on the upper run 141, as indicated by the arrows 144. As the debris reaches the upper end 139 of the conveyor, the debris is brushed from the belt 137 by the rotary brush 145 and cast into the chute 147, as indicated by the arrow 359, for discharge onto the earth surface 12. After being cleaned of debris by the sieving conveyor, the water circulates from this conveyor to the pump assembly 65 for recirculation into the washing compartment. Silt which is too fine for removal by the sieving conveyor settles in the sump 55 and is removed from time to time by the valve thereof. Since the water of the bath 40 is recirculated after being cleaned, the harvester 10 does not require a continuous supply of water to replace the limited quantity which is discharged from the sumps, lost by evaporation, and carried out with the tomatoes and debris on the conveyors 125 and 135.

The tomatoes 15 which have been washed and externally sterilized in the compartment 43 are discharged therefrom, as previously described, into the upper run 266 of the conveyor 260 where they are transported in the direction of the arrow 268 onto the upper run 276 of the conveyor 275. The tomatoes are carried by the later conveyor in the direction of the arrow 278 into the unit 275 and are received on the sizing conveyor 282. Tomatoes which are undesirably small fall between the bars 288 of this conveyor and are rejected onto the earth surface 12, as indicated by the arrows 361. Tomatoes of proper size which have been removed in a stream from the pool 75, however, are carried successively as indicated by the arrow 286 into the air blast 295 which dries moisture from the pool which remains on the surface of the tomatoes.

The tomatoes 15, which have been washed, sanitized, sized, and dried by the harvester 10 by the method of the present invention are then transported by the discharge system 310 as indicated by the arrows 319 for discharge by the elevator 314.

The operations required for the harvesting of green tomatoes 15 to deliver them in a condition in which they are ready for transit while ripening are thus preformed continuously by the harvester 10 without human contact with the tomatoes or the vines 14 on which they are grown. Damage to the tomatoes during these operations is minimized by the use of the aqueous bath 40 to receive the tomatoes as they are separated from the vines. The bath also serves to wash the tomatoes and the recirculation of the liquid of the bath allows the harvester to operate without a continuous supply of water. The separating and washing operations carried out by the harvester insure that the tomatoes are delivered free from earth, tomato and vine fragments, and other debris, while the air blast delivered in the unit 280 results in the tomatoes being delievered in a dry as well as a fully cleaned condition.

Although the invention has been herein described in what is conceived to be the most practical and preferred method and apparatus, it is recognized that departures may be made therefrom within the scope of the invention, which is not to be limited to the illustrative details disclosed.

Having described my invention, what I claim as new and desire to secure by Letters Patent is:

1. A harvester for green tomatoes growing on vines in a row comprising:
    A. a frame;
    B. means supporting the frame for travel along such a row;
    C. means on the frame for severing vines in the row from the ground as the frame travels along the row;
    D. an aqueous bath mounted on the frame;
    E. means mounted on the frame above the bath adapted to receive vines with tomatoes thereon from the severing means and to shake tomatoes from the severed vines into the bath while excluding the vines from the bath and discarding the same;
    F. means on the frame for removing tomatoes from the bath; and
    G. means on the frame for drying surface moisture from the tomatoes removed from the bath, in which the bath comprises a tank having a dividing wall separating the tank into a tomato washing compartment and a water cleaning compartment interconnected in a closed circuit, a pump for circulating water in the closed circuit from the tomato washing compartment to the water cleaning compartment and return in a predetermined direction of flow in each compartment, a straining conveyor mounted in the tomato washing compartment and upwardly inclined from the tank at a position in the predetermined direction of flow therein to strain tomatoes from the bath and to elevate them from the tank and a sieving conveyor mounted in the water cleaning compartment and upwardly inclined from the tank at a position in the predetermined direction of flow therein to sieve debris from the bath and to elevate it from the tank.

2. The harvester of claim 1 in which the straining conveyor and the sieving conveyor have openings therethrough, the openings in the straining conveyor being substantially larger than the openings in the sieving conveyor to pass debris of small particle size while elevating tomatoes which are substantially larger than said small particle size, the closed circuit between the washing compartment and the cleaning compartment having a constriction providing an opening smaller than the openings in the straining conveyor and larger than the openings in the sieving conveyor to exclude tomatoes which are larger than a predetermined size from the cleaning compartment and to admit debris to the cleaning compartment.

3. The harvester of claim 2 including means on the frame for subjecting tomatoes removed from the bath by the straining conveyor to a blast of air to remove surface moisture therefrom.

4. A harvester for green tomatoes growing on vines in a row comprising:
    A. a frame mounted for earth traversing movement along the row;
    B. means mounted in the frame for severing the tomato vines from the ground as the frame travels along the row;
    C. means mounted in the frame for elevating the severed vines with tomatoes adherent thereto;
    D. an aqueous bath mounted in the frame;
    E. means mounted in the frame above the bath adapted to receive vines with the tomatoes adherent thereto from the elevating means and to separate the tomatoes from the vines for descent into the bath;
    F. means for circulating the bath to wash the tomatoes therein;
    G. means for removing the tomatoes from the bath; and
    H. means mounted in the frame adapted to receive tomatoes from the removing means and to subject the tomatoes to an air blast to remove surface moisture therefrom, in which the bath comprises a tank having a dividing wall separating the tank into a tomato washing compartment and a water cleaning compartment interconnected in a closed circuit, the means for circulating the bath to wash the tomatoes is a pump for circulating water in the closed circuit from the tomato washing compartment to the water cleaning compartment and return in a predetermined direction of flow in each compartment, the means for removing the tomatoes from the bath is a straining conveyor mounted in the tamato washing compartment and upwardly inclined from the tank at a position in the predetermined direction of flow therein to strain tomatoes from the bath and to elevate them from the tank, and a sieving conveyor is mounted in the water cleaning compartment and upwardly inclined from the tank at a position in the predetermined direction of flow therein to sieve debris from the bath and to elevate it from the tank.

5. The harvester of claim 4 in which the straining conveyor and the sieving conveyor have openings therethrough, the openings in the straining conveyor being substantially larger than the openings in the sieving conveyor to pass debris of small particle size while elevating tomatoes which are substantially larger than said small particle size, the closed circuit between the washing compartment and the cleaning compartment having a constriction providing an opening smaller than the openings in the straining conveyor and larger than the openings in the sieving conveyor to exclude tomatoes which are larger than a predetermined size from the cleaning compartment and to admit debris to the cleaning compartment.

6. A harvester for field grown products comprising a vehicle adapted for field travel, a product washing compartment mounted on the vehicle, a water cleaning compartment mounted on the vehicle, the washing compartment and the cleaning compartment being interconnected in a closed circuit, means for severing products from the field and delivering them to the washing compartment during field travel, a pump for circulating water in the closed circuit from the washing compartment to the cleaning compartment and return to the washing compartment, a straining conveyor mounted in the washing compartment for straining products from the water circulated in the circuit and delivery of such products from the washing compartment, and a sieving conveyor mounted in the cleaning compartment for sieving debris from the water circulated in the circuit and removal of such debris from the cleaning compartment.

7. A harvester for field grown products comprising a vehicle adapted for field travel, a product washing compartment mounted on the vehicle, a water cleaning compartment mounted on the vehicle, the washing compartment and the cleaning compartment being interconnected in a closed circuit, means for delivering products from the field to the washing compartment, a pump for circulating water in the closed circuit from the washing compartment to the cleaning compartment and return to the washing compartment, a straining conveyor mounted in the washing compartment and upwardly inclined from the washing compartment to strain products from the water circulated in the circuit, and a sieving conveyor mounted in the cleaning compartment and upwardly inclined from the cleaning compartment to sieve debris from the cleaning compartment and to elevate it therefrom.

8. The harvester of claim 7 in which the straining conveyor and the sieving conveyor have openings therethrough, the openings in the straining conveyor being substantially larger than the openings in the sieving conveyor to pass debris of small particle size while elevating products which are substantially larger than said small particle size, the closed circuit between the washing compartment and the cleaning compartment having a constriction providing an opening smaller than the openings in the straining conveyor and larger than the openings in the sieving conveyor to exclude products which are larger than a predetermined size from the cleaning compartment and to admit debris to the cleaning compartment.

9. The harvester of claim 7 in which the water in the closed circuit is circulated in a predetermined direction in each compartment, the straining conveyor is mounted in the washing compartment and is upwardly inclined from the washing compartment at a position in the predetermined direction of flow therein to strain products from the water and to elevate them from a washing compartment and the sieving conveyor is mounted in the cleaning compartment and upwardly inclined from the cleaning compartment at a position in the predetermined direction of flow therein to sieve debris from the water and to elevate it from the cleaning compartment.

10. The harvester of claim 7 for use in harvesting field grown products which are buoyant in water in which the delivering means deposits the products into the water circulating in the washing compartment whereby the circulating water cushions the products as they are deposited therein.

* * * * *

UNITED STATES PATENT AND TRADEMARK OFFICE
CERTIFICATE OF CORRECTION

PATENT NO. : 4,294,063

DATED : October 13, 1981

INVENTOR(S) : George Bianchi

It is certified that error appears in the above-identified patent and that said Letters Patent are hereby corrected as shown below:

Column 1, line 24, delete "in" and substitute

---is---;

Column 9, line 60, delete "223" and substitute

---233---; and

Column 11, line 34, delete "pre-" and substitute

---per- ---.

Signed and Sealed this

Twenty-second Day of December 1981

[SEAL]

Attest:

GERALD J. MOSSINGHOFF

Attesting Officer

Commissioner of Patents and Trademarks